US007436401B2

(12) United States Patent
Szepesi et al.

(10) Patent No.: US 7,436,401 B2
(45) Date of Patent: Oct. 14, 2008

(54) CALIBRATION OF A VOLTAGE DRIVEN ARRAY

(76) Inventors: Leslie Louis Szepesi, 10321 Lak Dr., SE., Salem, OR (US) 97306; Eric Martin, 7753 NW. Arboretum Rd., Corvallis, OR (US) 97330; Adam Ghozeil, 3730 NW. Roosevelt Dr., Corvallis, OR (US) 97330

( * ) Notice: Subject to any disclaimer, the term of this patent is extended or adjusted under 35 U.S.C. 154(b) by 667 days.

(21) Appl. No.: 10/777,321

(22) Filed: Feb. 12, 2004

(65) Prior Publication Data

US 2005/0179676 A1 Aug. 18, 2005

(51) Int. Cl.
*G06F 3/038* (2006.01)
*G09G 5/00* (2006.01)

(52) U.S. Cl. .................................... 345/212; 345/100

(58) Field of Classification Search ................. 345/103, 345/204, 98–100, 211–213
See application file for complete search history.

(56) References Cited

U.S. PATENT DOCUMENTS

| | | | | |
|---|---|---|---|---|
| 5,250,937 | A | 10/1993 | Kikuo et al. | |
| 6,133,683 | A | 10/2000 | Enomoto et al. | |
| 6,151,005 | A | 11/2000 | Takita et al. | |
| 6,359,389 | B1 | 3/2002 | Medina et al. | |
| 6,377,317 | B1 | 4/2002 | Kiga et al. | |
| 6,429,841 | B1 | 8/2002 | Lee | |
| 7,038,646 | B2 * | 5/2006 | Fallot-Burghardt et al. | ... 345/89 |
| 2002/0054424 | A1 | 5/2002 | Miles | |
| 2003/0122760 | A1 | 7/2003 | Fallot-Burghjardt | |
| 2003/0201955 | A1 | 10/2003 | Song et al. | |
| 2003/0201959 | A1 * | 10/2003 | Sakaguchi | .................. 345/87 |
| 2004/0021627 | A1 * | 2/2004 | Maki | .......................... 345/89 |

FOREIGN PATENT DOCUMENTS

| | | | |
|---|---|---|---|
| EP | 0686955 | A1 | 12/1995 |
| EP | 0 695 959 | A | 2/1996 |
| EP | 0686955 | B1 | 8/1999 |

* cited by examiner

*Primary Examiner*—Ricardo L Osorio

(57) ABSTRACT

The present invention provides a voltage driven array having an array of discrete elements arranged in at least one row and plurality of columns. A resistive element has a first end and a second end provided with a first voltage and a second voltage respectively. The first voltage is different from the second voltage. Positions along the resistive element connect to each of the rows or columns such that each of the different positions along the resistive element supplies a different voltage to the respective row or column than a remainder of the positions.

19 Claims, 5 Drawing Sheets

CALIBRATION OF A VOLTAGE DRIVEN ARRAY

BACKGROUND

A voltage driven array is a semiconductor device comprised of a plurality of individual addressable elements forming a two-dimensional array of voltage driven elements. For example, one known application of a voltage driven array is a pixel display screen, where each pixel on the display screen is an addressable element in the voltage driven array.

Each of the elements in a voltage driven array generates an output in response to an input driving voltage source. For example, in the case of a pixel display screen, a desired pixel (having a particular row/column address in the array) can be caused to allow light waves of a particular frequency to escape (thereby producing a particular visible color) by applying a particular magnitude of driving voltage to the corresponding element of the array.

The output of a given element in a voltage driven array is dependent upon, among other things, the driving voltage level applied to the element, as well as the mechanical and optical properties of the element. These mechanical and optical properties in turn depend on the thickness (and material properties) of the thin films from which they are constructed. However, conventional semiconductor fabrication processes used to fabricate voltage driven arrays can result in a variation in the thickness and the material properties of the thin films across the device. As a result, applying a particular driving voltage to an element positioned at one location on a voltage driven array may generate an output that is different from the output of an element positioned at another location on the array in response to the same driving voltage level. For example, if a given driving voltage level is applied to one element on a pixel display device, the resulting gray-scale or color output may be different from the output of a different element on the same array, if the thickness of the array varies from the first element to the second element.

The present invention was developed in light of these considerations.

BRIEF DESCRIPTION OF THE DRAWINGS

The present invention will now be described, by way of example, with reference to the accompanying drawings, in which.

DETAILED DESCRIPTION

The embodiments described herein are directed to methods and systems for compensating for varying thicknesses of semiconductor voltage driven array devices when applying driving voltages to the individual array elements. Generally, different voltage levels are applied to the different array elements by a voltage supply source. The voltage supply source includes a resistive element and one or more voltage sources that apply a voltage differential across the resistive element, thereby generating different voltage levels at different physical locations along the resistive element. The array elements are connected to the resistive element at varying physical locations along the resistive element to generate different driving voltages, which are applied to the corresponding array elements.

Figure 1:
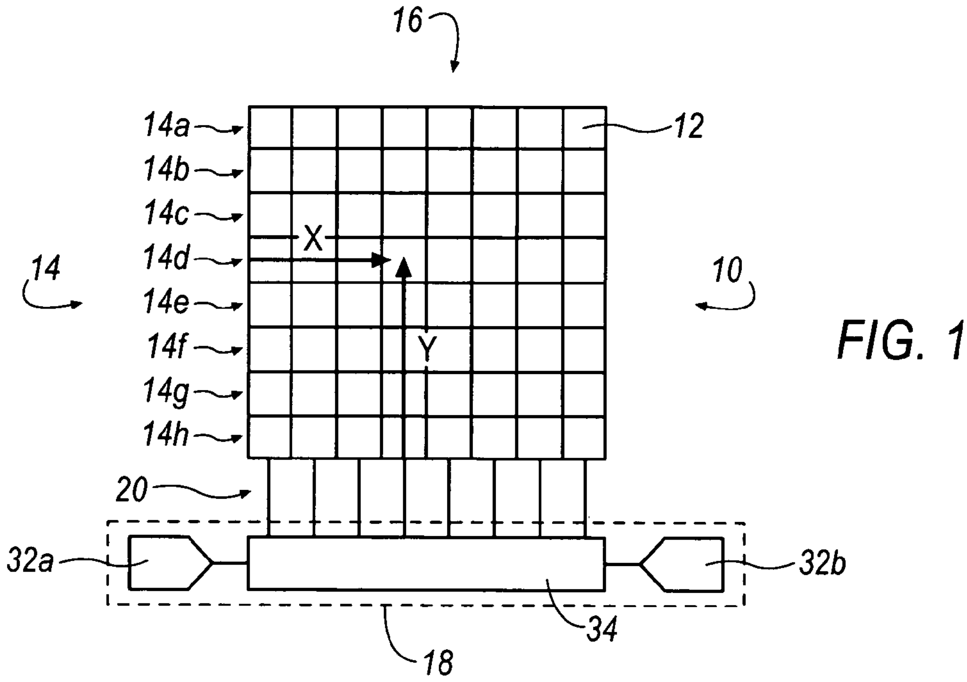
FIG. 1 is a schematic view of a voltage driven array according to an embodiment.

Referring now to FIG. 1, a voltage driven array 10 is shown having a plurality of discrete elements 12 divided into rows 14 (14*a*-14*h*) and columns 16. A voltage supply source 18 is connected to the voltage driven array 10 by a plurality of taps 20. Each of the taps 20 connects to a respective column 16 such that, in conjunction with a time delay multiplexed process, each of the discrete elements is driven by the voltage supply source 18 in an addressable fashion (as will be discussed in greater detail). The taps 20 connect to each discrete element by conductive silicon connections, copper wires or any other known means of connecting a voltage driving source to respective discrete elements, as will be readily understood by one skilled in the art. The taps 20 can be metal conductors connecting to some transistor circuitry in each of the discrete elements 12 in column 16. Such metal may be aluminum, or a stack of aluminum with layers of refractory metal such as titanium. Taps 20 may also be doped polysilicon. One skilled in the art will recognize other materials for use as taps 20.

The voltage supply source 18 comprises DAC (Digital Analog Converter) 32*a* and DAC 32*b* connected to opposite ends of a resistive element 34. DAC 32*a* and DAC 32*b* together apply a voltage differential across resistive element 34. In an embodiment of the invention, resistive element 34 is a single element of polycrystalline silicon. The taps 20 are connected to resistive element 34 at different locations along the resistive element 34. As a result, the resistive element acts as a "voltage divider" in that the voltage level present at each tap 20 is a function of the physical position of the taps 20 on the resistive element 34. The resistance of the resistive element 34 may be chosen to provide a substantially higher current in the resistive element 34 with respect to the taps 20, to approximate a situation where no current flows in the taps, as will be readily understood by one skilled in the art.

Each of the discrete elements 12 can be any voltage driven element. In one embodiment, each of the discrete elements is an interferometer. One skilled in the art, however, will readily understand that discrete elements 12 may be any voltage driven elements arranged in an array.

Figure 2:
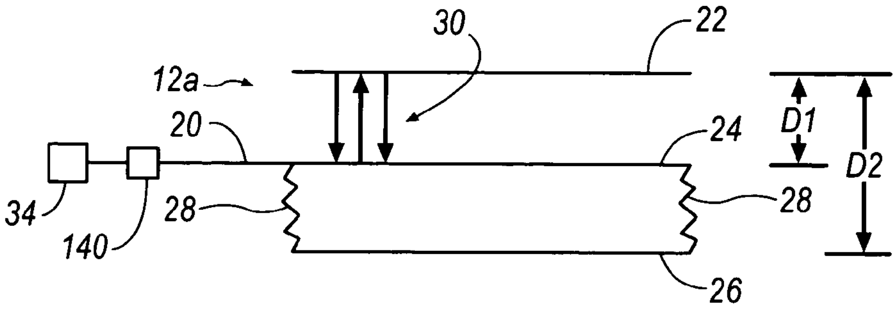
FIG. 2 is a schematic view of an illumination element for a voltage driven array according to an embodiment.

FIG. 2 illustrates a cross-sectional view of an exemplary illumination element 12*a* that may comprise the discrete elements 12 in FIG. 1. Element 12*a* may be a MEM (Micro Electrical Mechanical) device used to allow certain light waves having a desired frequency to exit from the MEM to thereby generate an illuminated response at a desired color. The illumination element 12*a* includes a semitransparent outer plate 22, reflective middle plate 24 and a lower plate 26. Springs 28 are disposed between reflective middle plate 24 and lower plate 26. The reflective middle plate 24 of each element 12*a* is connected to a corresponding tap 20, which in turn, is connected to the resistive element 34. A switch circuit 140 is positioned at some juncture along each tap 20 as will be discussed further below. The lower plate 26 is connected to another electrical potential that is different from that supplied by the taps 20, which in an embodiment of the invention is ground potential. In other embodiments, the polarity of the taps 20 and lower plate 26 may be reversed from that shown herein.

In FIG. 2, outer plate 22 is shown separated from middle plate 24 by distance D1, and outer plate 22 is shown separated from lower plate 26 by distance D2. Distance D2 represents the thickness of a given element in the voltage driven array. Thus, as a result of the semiconductor fabrication process referred to hereinabove, distance D2 may vary from element to element across the voltage driven array 10 (FIG. 1).

Functionally, white light passes through outer plate 22 and is reflected by middle plate 24. The light waves 30 reflected from middle plate 24 through outer plate 22 comprise the output of each of the elements of the voltage driven array 10. The light waves 30 reflected from middle plate 24 and output through outer plate 22 consists of light having a single frequency (a natural frequency) that is dependent upon the distance D1 between the outer plate 22 and the middle plate 24. Reflected light waves having frequencies other than the natural frequency associated with distance D1 are eliminated by destructive interference that occurs between middle plate 24 and outer plate 22 before they are output through the outer plate 22. This destructive interference is accomplished by bouncing light between the reflective middle plate 24 and semi-reflective properties of outer plate 22. As a result, the output of each element 12*a* is correlated to the distance D1 between the outer plate 22 and the middle plate 24.

The distance D1 between the outer plate 22 and the middle plate 24 may be intentionally adjusted by an electronic controller (not shown) to allow light waves of different frequencies to emerge from the array element 12 by applying different driving voltages to the associated tap 20. In this way, the controller can cause each of the illumination elements 12*a* to allow a desired wavelength of light (i.e., a desired color) to exit from the illumination elements 12*a*. When the reflective middle plate 24 is energized by an input driving voltage from voltage supply source 18, electrical charge accumulates on the middle plate 24 and the lower plate 26, creating a capacitive element. The difference in electrical charges between reflective middle plate 24 and lower plate 26 causes reflective middle plate 24 to compress springs 28 and to be drawn towards lower plate 26. The greater $V_{REF}$ applied to tap 20, the greater the amount of charge that accumulates on middle plate 24, and as a result, the greater the distance between reflective middle plate 24 and outer semitransparent plate 22 due to the increased electrostatic attraction (or force) between reflective middle plate 24 and lower plate 26.

Figure 2A:
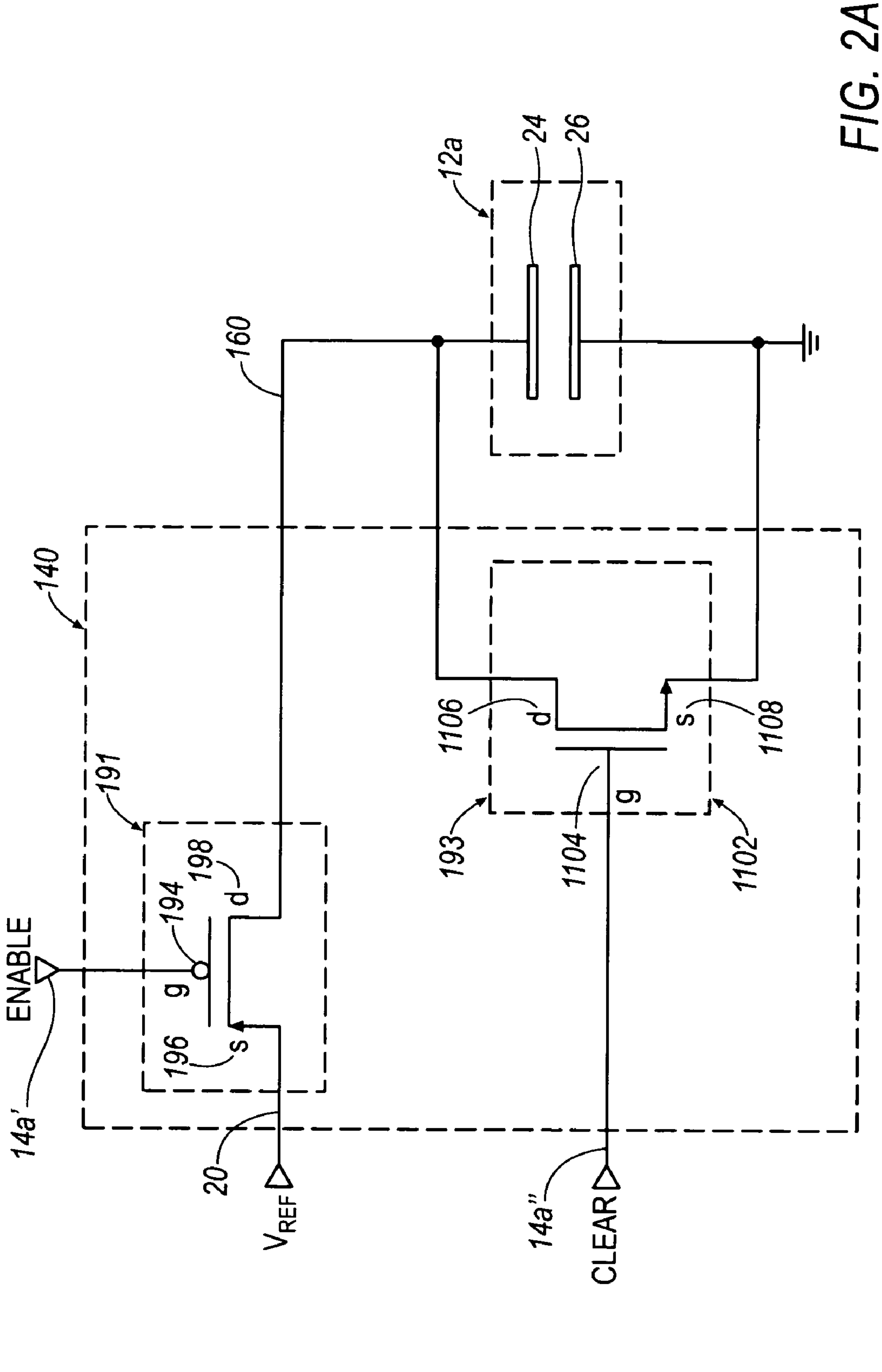
FIG. 2A is a schematic view of an embodiment of a switch circuit according to an aspect of the present embodiments.

In FIG. 2A, switch circuit 140 is described in greater detail. The switch circuit 140 includes a first switch 191 and a second switch 193. For each of the rows 14, paths 14*a*', 14*b*' . . . (hereinafter referred to as 14') provides an ENABLE signal. Likewise, for each of the rows 14, paths 14*a*", 14*b*" . . . (hereinafter referred to as 14") provides a CLEAR signal. In some embodiments, the ENABLE signal and CLEAR signal are provided by an electronic controller (not shown). The first switch 191 receives a selected reference voltage ($V_{REF}$) at source 196 via the taps 20 (See FIGS. 1 and 2) and the ENABLE signal at gate 194 via path 14'. Drain 198 is coupled to reflective middle plate 24 of illumination element 12*a* via path 160. Second switch 193 is coupled across illumination element 12*a* with drain 1106 coupled to reflective middle plate 24 and source 1108 coupled to lower plate 26 via ground. Second switch 193 receives the CLEAR signal at gate 1104 via path 14".

Switch circuit 140 operates as described below to cause a charge differential between reflective middle plate 24 and lower plate 26. Initially, the ENABLE signal is at a "high" level, the CLEAR signal is at a "low" level, and the reference voltage is at a selected voltage level. As a result, first switch 191 and second switch 193 are both off. The CLEAR signal is then changed from a "low" level to a "high" level, causing second switch 193 to turn on and pull reflective middle plate 24 to ground, thereby removing any charge differential between middle plate 24 and lower plate 26. The CLEAR signal is then returned to the "low" level causing second switch 193 to again turn off.

The ENABLE signal is then changed from the "high" level to a "low" level, causing first switch 191 to turn on to thereby apply the reference voltage to reflective middle plate 24 and cause a desired charge to accumulate on reflective middle plate 24 and lower plate 26, and thereby set a gap distance between reflective middle plate 24 and lower plate 26. The ENABLE signal stays "low" for a predetermined duration before returning to the "high" level causing first switch 191 to again turn off, decoupling the reference voltage from illumination element 12*a*. At this point, the illumination element 12*a* is isolated from $V_{REF}$, and charge can no longer flow. The predetermined duration is shorter than a mechanical time constant of illumination element 12*a*, resulting in the reflective middle plate 24 and lower plate 26 appearing to be substantially "fixed" during the predetermined duration so that the stored charge can be calculated without having to compensate for a changing distance between the reflective middle plate 24 and a lower plate 26.

Figure 2B:
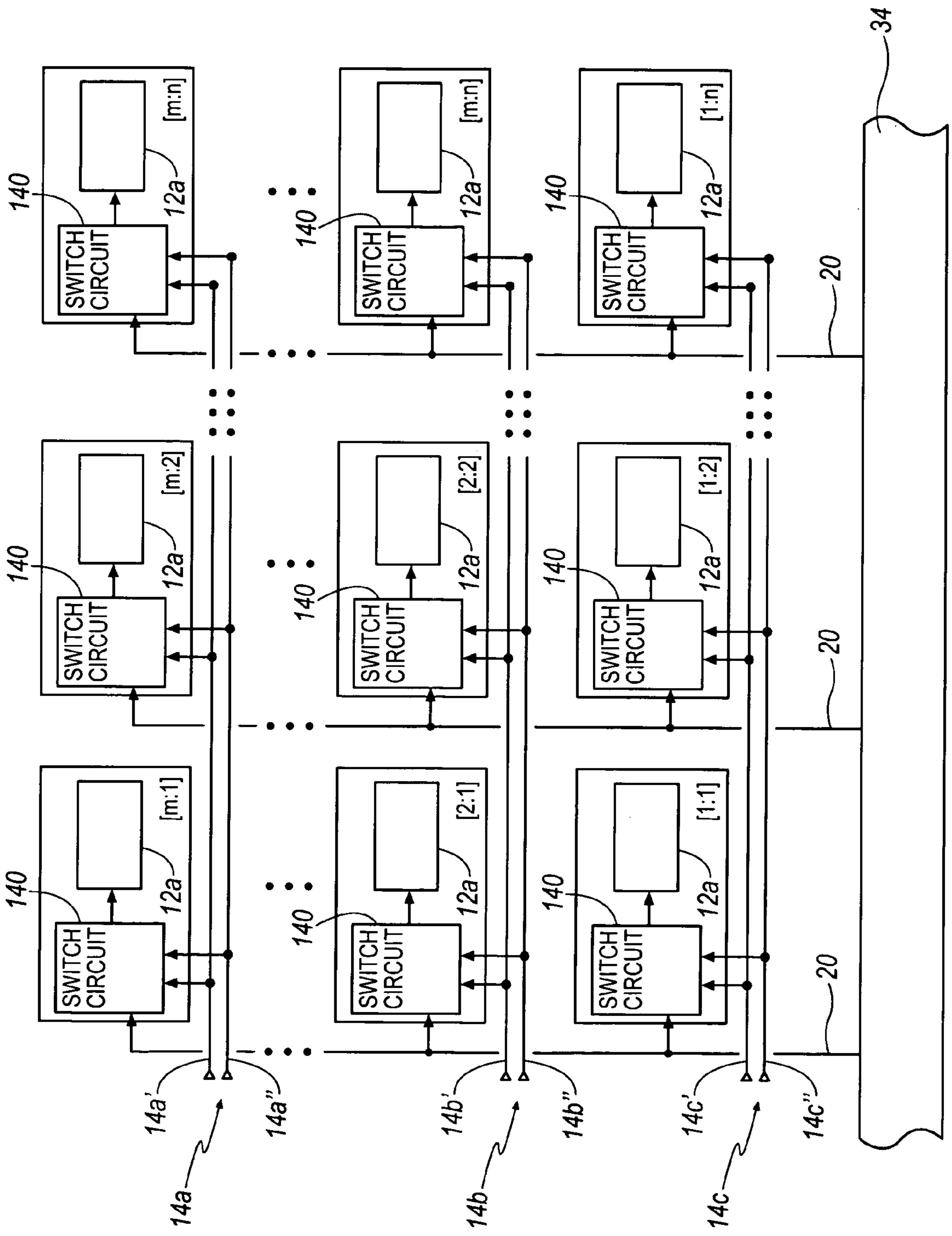
FIG. 2B is a schematic view of an embodiment of an array according to an aspect of the present embodiments.

FIG. 2*b* is a block diagram illustrating an exemplary embodiment of the switch circuit 140 in conjunction with the present embodiments. Each illumination element 12*a* includes a switch circuit 140.

Each switch circuit 140 is configured to control the magnitude of a stored charge differential between middle plate 24 and lower plate 26 of its associated illumination element 12*a* to thereby control the associated distance between reflective middle plate 24 and lower plate 26. as discussed above, the distance between reflective middle plate 24 and lower plate 26 directly affects the color output from the illumination element 12*a*. Each row 14 of the array 10 (See FIG. 1) receives a separate CLEAR signal from path 14" and ENABLE signal from path 14' with all switch circuits 140 of a given row receiving the same CLEAR and ENABLE signals. Each column of the array 10 receives a separate reference voltage ($V_{REF}$) from the taps 20.

To store, or "write", a desired charge to each reflective middle plate 24, a reference voltage having a selected value is provided to each of the columns 16 via taps 20. As described herein below, the reference voltage provided to each element 12 may be different. The CLEAR signal for the given row is then "pulsed" for a fixed duration to cause each of the switch circuits 140 of the given row to remove, or CLEAR, any potential stored charge from its associated illumination element 12*a*. The ENABLE signal from path 14' for the given row 14 is then "pulsed" to cause each switch circuit 140 of the given row to apply its associated reference voltage to its associated reflective middle plate 24. As a result, a stored charge having a desired magnitude based on the value of the applied reference voltage is stored on the reflective middle plate 24 to thereby set the gap distance between reflective middle plate 24, and lower plate 26, based on the desired magnitude of the stored charge. This procedure is repeated for each row of the array 10 to "write" a desired charge to each illumination element 12*a* of the array 10.

With reference to FIG. 2, the distance D1 is a function of the distance D2 between outer semitransparent plate 22 and lower plate 26, i.e., the width of the semiconductor device. A larger distance D2 will result in a larger distance D1 for the same applied voltage. Therefore, if the width D2 of the semiconductor device is smaller for a first illumination element 12*a* relative to a second illumination element 12*a*, then the corresponding distance D1 and the natural frequency of light corresponding to distance D1 is also smaller in the first illumination element 12*a* relative to the second illumination element 12*a*. Accordingly, the first and second illumination elements 12*a* would output light waves having different frequencies, even though the same driving voltage (shown as $V_{REF}$ in FIG. 2A) was applied.

Therefore, different driving voltages are required to generate the same desired output from different illumination elements 12*a* over the same voltage driven array. Specifically, to generate a particular output from a relatively thin element of array 10, i.e., a relatively small distance D2, distance D1 should be increased more than normal in response to a driving voltage. Thus, a relatively greater driving voltage should be applied to reflective middle plate 24 to draw reflective middle plate 24 closer to lower plate 26. This movement results in an increased distance D1 for that particular illumination element 12*a* with respect to the other illumination elements 12*a*. Conversely, to generate the same output from a relatively thick element of array 10, i.e., a relatively large distance D2, distance D1 should be increased less than normal in response to a driving voltage. Thus, a relatively smaller driving voltage should be applied to reflective middle plate 24 to draw reflective middle plate toward lower plate 26 to a lesser degree. As a result, distance D1 would be smaller than it would otherwise have been if the relatively smaller driving voltage was not applied.

The inventors have recognized that the variation in the semiconductor thickness D2 may tend, in some situations, to vary linearly across the device. When the thickness variation is approximately linear, a linearly-changing voltage source may be applied across the fabricated semiconductor wafer, by virtue of the resistive element 34, to compensate for a linearly changing thickness D2 of the array. A method for determining the appropriate driving voltage for each element 12 and an apparatus for generating those driving voltages is hereinafter described.

Assume that the voltage driven array of FIG. 1 has a thickness D2 that decreases in an approximately linear fashion from the lower left hand corner to the upper right hand corner of array 10 (FIG. 1). To generate the same output from each of the illumination elements 12*a* (assuming illumination elements 12*a* replace discrete elements 12 in FIG. 1), a relatively lower voltage would need to be applied to the elements in the lower left hand corner of the array, and a relatively higher voltage would need to be applied to the elements in the upper right hand corner of the array. The various driving voltages required to generate the same output from each of the elements, then, can be determined based upon the position of the element in the array and certain empirically-determined driving voltages. For instance, assume that the middle element in the array is to be driven at a nominal voltage level of V0 to generate a particular output. Then, for a given semiconductor array, the desired driving voltage for the lower left hand corner element can be expressed as V0−ΔV2, and the desired driving voltage for the upper right hand corner element can be expressed as V0+ΔV1, where ΔV1 and ΔV2 are empirically pre-determined for a given semiconductor wafer or fabrication process. Then, the required driving voltage (the "applied voltage") for any element in the array can be determined in terms of V0, ΔV1, and ΔV2 based upon the X, Y position (row and column coordinates) of the element in the array, as shown below in Equation (1).

$$\text{Driving Voltage}=Vo+X\cdot Y\cdot\Delta V1+(1-X)(1-Y)(-\Delta V2) \quad (1)$$

With ΔV1 and ΔV2 being empirically determined constants, the appropriate driving voltage to generate any desired output for any element in the array can be derived from Equation (1) by substituting the nominal driving voltage V0 associated with the desired output and the X, Y coordinates of the element to be activated.

Voltage source 18, in combination with a time delay multiplex method, can be used to generate the desired driving voltages in each of the illumination elements 12*a*, as calculated from Equation (1). As evident from Equation (1), each element in a voltage driven array having a varying thickness may require a different driving voltage to generate the same output. Thus, the voltage driven array 10 (FIG. 1) may require voltage variation across the array 10 both horizontally (across columns from left to right in FIG. 1) and vertically (across rows from bottom to top in FIG. 1). Horizontal voltage variation (moving from left to right across columns) in FIG. 1 is accomplished by the voltage dividing characteristics of the resistive element 34. That is, the voltage differential between the output voltages of DAC 32*a* and DAC 32*b* is linearly divided by resistive element 34. In the situation where the thickness of the voltage driven array 16 decreases from left to right in FIG. 1, the output voltage of DAC 32*a* would be greater than the output voltage of DAC 32*b*. In this way, the driving voltages applied to the taps 20 would decrease linearly from left to right along resistive element 34 in FIG. 1.

Adjustment of the output voltages of DAC 32*a* and DAC 32*b* in combination with a time delay multiplexing method can be used to adjust the driving voltage vertically in the array. The time delay multiplexing, which includes activating and deactivating respective rows to allow voltages supplied to the columns to only drive the selected rows, may be accomplished by any means known to one skilled in the art. By way of example, at time=T1, a digital signal representative of voltage V11 may be supplied to DAC 32*a*, which converts the signal into an analog output voltage. A relatively lower voltage V2 is supplied by DAC 32*b* in response to a corresponding digital signal. The voltage difference between DAC 32*a* and DAC 32*b* represents the voltage differential needed to drive the discrete elements from the left hand side of row 14*a* to the right hand side of row 14*a*. The taps 20 supply a stepwise decreasing driving voltage, based on the well-known voltage divider rule applied to the resistance of the resistive element 34, from the left hand column of row 14*a* to the right hand column of row 14*a*. The row 14*a* is activated while the remaining rows 14 remain deactivated, such that only row 14*a* is driven. Next, at time T=2, row 14*b* is activated while the remaining rows 14 are deactivated such that row 14*b* is driven by the voltage supply source 18. Here, a new voltage V12 is supplied from DAC 32*a* and a new voltage V22 is supplied from DAC 32*b*. New voltages V12 and V22 are different from previous voltages V11 and V21 so as to generate the desired driving voltages from row 14*b*. For example, if the thickness of array 10 increases from row 14*a* to row 14*h*, then new voltages V12 and V22 will be less than previous voltages V11 and V21. The resistive element 34, again, provides the needed stepwise change in voltage horizontally from the left hand side to the right hand side of the row 14*b*. This process is then repeated for each row of the array.

It will be readily understood that, as opposed to the configuration described above, the resistive element 34 may be positioned along the rows 14, while time delay multiplexing is applied to the columns. Alternatively, resistive elements 34 may be positioned along both rows and columns to stepwise adjust each of the illumination elements 12*a*. It should also be understood that, although the present invention has been described with respect to illumination elements 12*a*, the present invention may be applied to any discrete voltage driven elements such as discrete elements 12 positioned in an array that require a voltage adjustment. Additionally, although the above-described embodiment assumes linear changing thickness D2 across the array 10, the resistance of the resistive element 34 may also be chosen to provide a non-linear voltage solution across the array 10.

Figure 3:
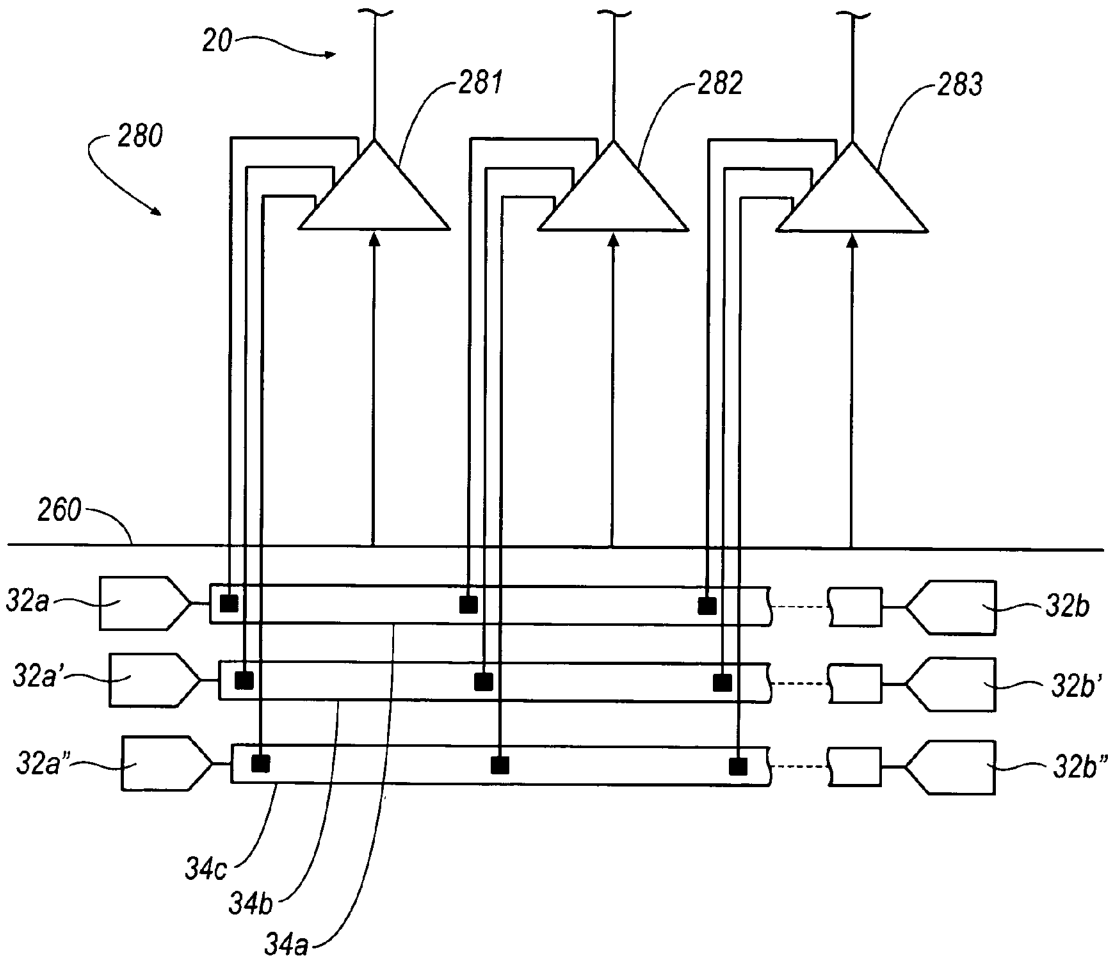
FIG. 3 is a schematic view of a voltage driven array according to an embodiment.

Referring now to FIG. 3, another embodiment of the present invention is shown and described. In FIG. 3, a plurality of taps 20 are connected to associated array elements 12 as described above in connection with FIGS. 1-2B. In this second embodiment, the voltage supply source includes resistive elements 34*a*, 34*b* and 34*c* connected to the plurality of taps 20 through analog multiplexers (MUXs) 280. MUXs 280 include MUXs 281, 282, 283, etc.

Each of the taps 20 are connected to each resistive element 34*a*, 34*b*, and 34*c* through multiplexers (MUX's) 280. Each of the resistive elements 34*a*, 34*b* and 34*c* operates as described in the previous sections, and descriptions for like elements are omitted. DACs 32*a* and 32*b*, 32*a*' and 32*b*', and 32*a*" and 32*b*" generate voltage differentials across resistive elements 34*a*, 34*b*, and 34*c*, respectively. The voltage differentials across resistive elements 34*a*, 34*b*, and 34*c* may be different from each other. Each of the voltage differentials and associated resistive element are determined so that, for a given illumination element 12*a* and (FIG. 1), a different driving voltage is applied to the illumination element through each of the three different resistive elements 34*a*, 34*b*, and 34*c*. The three different driving voltages may be determined so as to cause three different colors to be generated by the associated illumination element when applied.

When the above-described embodiment is implemented, the voltage differentials generated by the pairs of DACs 32*a* and 32*b*, 32*a*' and 32*b*' and 32*a*" and 32*b*" are applied to the illumination elements 12*a* by use of MUXs 280. MUXs 280 select an analog reference voltage for each column, in accordance with column data 260. For example, analog MUX 281 selects an analog voltage from among resistive elements 34*a*, 34*b*, and 34*c* to apply to the taps 20. Similarly, analog MUX 282 selects an analog voltage from the same set of resistive elements 34*a*, 34*b*, and 34*c* to apply to the respective tap 20, and analog MUX 283 selects an analog voltage from the same set of resistive elements 34*a*, 34*b*, and 34*c* to apply to its respective tap 20. As described in previous embodiments, paths 14' and 14" (FIG. 2A) act as ENABLE and CLEAR signals for driving the selected column voltage from resistive elements 34*a*, 34*b*, and 34*c* for the selected illumination element 12*a*.

Additional colors beyond the three predetermined colors can be generated by mixing the three predetermined colors by time multiplexing outputs from each of the resistive elements 34*a*, 34*b* and 34*c* to the respective illumination elements. For example, if a color halfway between red and green is desired, an illumination element 12 can be driven red for one frame (complete cycle of driving the array) and green for the next frame. This ratio can be varied in integral steps to obtain the desired color mix. The color resolution depends on the refresh rate of the system compared to the eye's temporal response. One skilled in the art will readily understand that variations from the colors recited above may be generated instead of red, green, or blue by time multiplexing.

Figure 4:
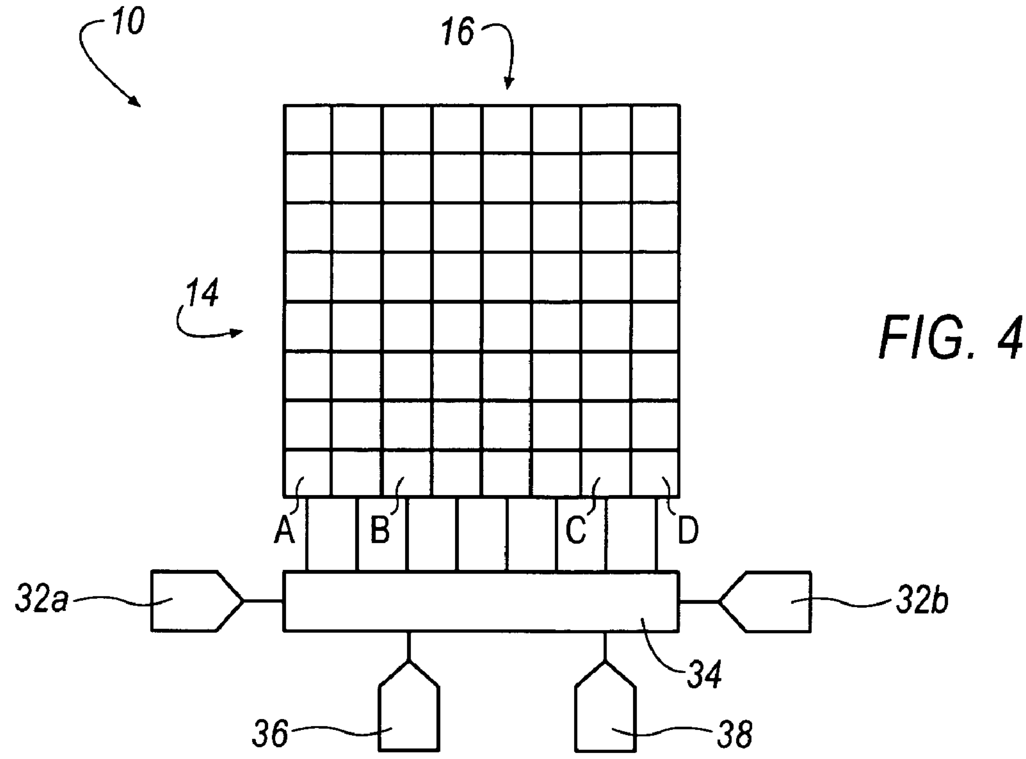
FIG. 4 is a schematic view of a voltage driven array according to an embodiment.
Figure 5:
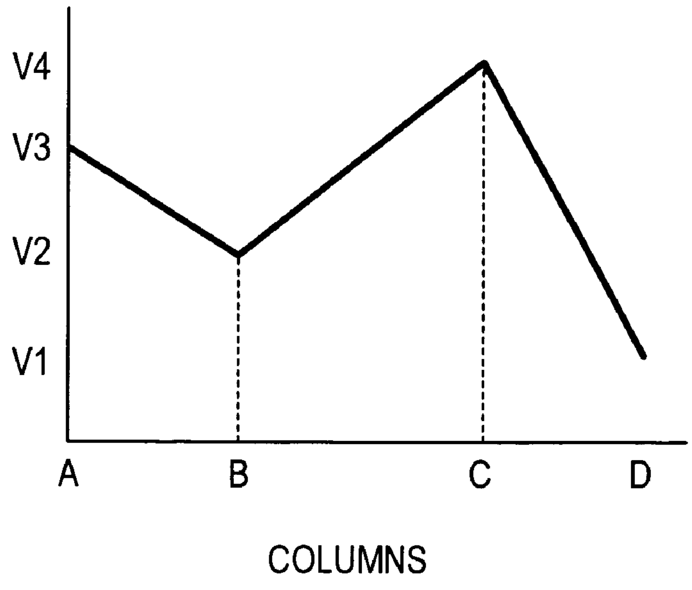
FIG. 5 is a graphical view of exemplary voltages generated by a voltage driven array according to an embodiment.

Referring now to FIGS. 4 and 5, another embodiment of the present invention is shown and described, wherein like components from previous embodiments have like reference numerals. In FIG. 4, the voltage driven array 10 is assumed to change in thickness in a stepwise fashion from points A to B, B to C, and C to D. This type of semiconductor thickness variation contrasts with the approximately linear variation described in connection with FIG. 1. In FIG. 4, the thickness D2 gets progressively larger from points A to B. The thickness D2 then gets progressively thinner from point B to point C, and then again gets progressively thicker from point C to point D. Additional DAC's 36 and 38 are connected proximate points B and C, respectively, along the resistive element 34 for reasons which will be discussed below.

FIG. 5 illustrates the voltages required to offset for the thickness variations described above along the array 10. The Y axis illustrates the required voltage for a given wavelength of light while the X axis illustrates the X position across the array. For example, to output a specific wavelength of light, column A must be supplied with a voltage V3, Column B must be supplied with a voltage V2, Column C must be supplied with a voltage V4 and Column D must be supplied with a voltage V1. One skilled in the art will readily recognize that many different variations on this example are possible, and that the present invention is not limited to that disclosed herein.

DACs 32*a*, 36, 38 and 32*b* (See FIG. 4) provide these voltages at columns A, B, C and D respectively. The resistance of resistive element 34 then acts as a voltage divider, as discussed in previous embodiments, to provide a linear voltage transition between each of the columns A, B, C and D to compensate for the thickness variations. As can be seen in FIG. 5, the driving voltage supplied to array 10 starts at voltage V3 and linearly drops to voltage V2 at point B. Then, the voltage linearly increases from point B to point C. The voltage at point C is then linearly dropped to the voltage required at point D. By this method, step wise or slowly changing non-uniformities that are approximately step wise (even those that are nonlinear), can be compensated for. Thus, although FIGS. 4 and 5 show a linear step wise variation between each of the respective points A, B, C, and D, the actual variation may be a non-linear curve that is approximated by a step wise model similar to that shown.

While the present invention has been particularly shown and described with reference to the foregoing preferred and alternative embodiments, it should be understood by those skilled in the art that various alternatives to the embodiments of the invention described herein may be employed in practicing the invention without departing from the spirit and scope of the invention as defined in the following claims. It is intended that the following claims define the scope of the invention and that the method and apparatus within the scope of these claims and their equivalents be covered thereby. This description of the invention should be understood to include all novel and non-obvious combinations of elements described herein, and claims may be presented in this or a later application to any novel and non-obvious combination of these elements. The foregoing embodiments are illustrative, and no single feature or element is essential to all possible combinations that may be claimed in this or a later application. Where the claims recite "a" or "a first" element of the equivalent thereof, such claims should be understood to include incorporation of one or more such elements, neither requiring nor excluding two or more such elements.

The invention claimed is:

1. A voltage driven array, comprising:

an array of discrete elements organized into at least one row and a plurality of columns; and a voltage supply configured to supply the array with voltages in a time delay multiplexed fashion, the voltage supply comprising:

a resistive element having a first end and a second end;

a first voltage applied to the first end and a second voltage applied to the second end that is different from the first voltage; and wherein each one of a plurality of positions on the resistive element connects to a respective one of the rows or columns such that each of the different positions along the resistive element supplies a different voltage to the respective row or column than a remainder of the positions.

2. The voltage driven array according to claim 1, wherein a resistive element is constructed of polysilicon.

3. The voltage driven array according to claim 1, further comprising a third voltage applied to the resistive element at a position between the first end and the second end.

4. The voltage driven array according to claim 1, wherein each of the columns connects to the resistive element.

5. The voltage driven array according to claim 1, further comprising:

a second voltage supply and a third voltage supply; and wherein each of the voltage supply, the second voltage supply and the third voltage supply provides the rows or columns with different voltages than a remainder of the voltage supply, the second voltage supply and the third voltage supply.

6. The voltage driven array according to claim 5, wherein:

said discrete elements are illumination elements;

the voltage supply supplies each of the columns or rows with voltages sufficient to generate a first color in the illumination elements;

the second voltage supply supplies each of the columns or rows with voltages sufficient to generate a second color in the illumination elements; and the third voltage supply supplies each of the columns or rows with voltages sufficient to generate a third color in the illumination elements.

7. The voltage driven array according to claim 6, wherein the first color is red, the second color is green and the third color is blue.

8. The voltage driven array according to claim 1, wherein each of the discrete elements is an illumination element.

9. The voltage driven array according to claim 8, wherein each of the illumination elements is an interferometer.

10. The voltage driven array according to claim 9, wherein each of the illumination elements further comprises:

an outer semitransparent plate;

a reflective middle plate positioned substantially parallel to and spaced from the semitransparent plate;

a lower plate connected to a first potential; and at least one spring positioned between the at least one reflective middle plate and the lower plate;

wherein said middle plate is connected to a second potential to generate a capacitance between the reflective middle plate and the lower plate to move the reflective middle plate to a position defining a desired distance between the reflective middle plate and the outer semitransparent plate.

11. The voltage driven array according to claim 10, wherein the desired distance defines a wavelength of light.

12. The voltage driven array according to claim 1, wherein the resistive element is a plurality of resistive elements each having a first end and a second end and each being connected to a respective one of the rows or columns through a plurality of multiplexers.

13. A method for providing a variable voltage to a voltage driven array, comprising:

providing an array of discrete elements organized into at least one row and a plurality of columns;

connecting positions along a resistive element to respective columns along the array of discrete elements, wherein the resistive element has a first end and a second end; and providing the first end with a first voltage and the second end with a second voltage that is different from the first voltage to generate a voltage in each of the columns that is different from a voltage in a remainder of the columns.

14. The method according to claim 13, wherein said at least one row comprises a plurality of rows, and further comprising the step of activating only one of the rows to supply voltage to only the one row with the resistive element.

15. A method according to claim 14, further comprising:

applying a new first voltage and a new second voltage;

activating a second row of the plurality of rows and deactivating the one row to supply voltage to only the second row with the resistive element.

16. The method according to claim 13, wherein the resistive element is constructed of polysilicon.

17. The method according to claim 13, further comprising:

applying a third voltage at a position along the resistive element between the first end and the second end; wherein the third voltage is different from the first voltage and the second voltage.

18. The method according to claim 13, wherein:

each of the discrete elements is an illumination element having a middle reflective plate and a lower plate separated from the middle reflective plate by at least one spring element; and the resistive element supplies a voltage to the middle element to create an attractive force between the middle element and the lower element.

19. A voltage driven array, comprising:

an array means of discrete elements organized into at least one row and a plurality of columns;

a voltage supply means configured to supply the array with voltages in a time delay multiplexed fashion, the voltage supply means comprising:

a resistive element means for reducing a voltage from a first end of the resistive element to a second end of the resistive element; and a first voltage means for driving the first end at a first voltage and a second voltage means for driving the second end at a second voltage that is different from the first voltage;

wherein each one of a plurality of positions on the resistive element means connects to a respective one of the rows or columns such that each of the different positions along the resistive element means supplies a respective one of the columns with a different voltage than a remainder of the positions.

* * * * *

UNITED STATES PATENT AND TRADEMARK OFFICE

CERTIFICATE OF CORRECTION

PATENT NO. : 7,436,401 B2 Page 1 of 1
APPLICATION NO. : 10/777321
DATED : October 14, 2008
INVENTOR(S) : Leslie Louis Szepesi et al.

It is certified that error appears in the above-identified patent and that said Letters Patent is hereby corrected as shown below:

Title page, Item (76), in "Inventors", delete "Lak" and insert -- Lake --, therefor.

Signed and Sealed this

Seventeenth Day of March, 2009

JOHN DOLL
*Acting Director of the United States Patent and Trademark Office*